(12) United States Patent
Li et al.

(10) Patent No.: US 11,251,439 B2
(45) Date of Patent: Feb. 15, 2022

(54) FUEL CELL AND FUEL CELL STACK

(71) Applicant: TAIYO YUDEN CO., LTD., Tokyo (JP)

(72) Inventors: Xinyu Li, Takasaki (JP); Chie Kawamura, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 181 days.

(21) Appl. No.: 16/684,394

(22) Filed: Nov. 14, 2019

(65) Prior Publication Data
US 2020/0168919 A1    May 28, 2020

(30) Foreign Application Priority Data
Nov. 28, 2018    (JP) .............................. JP2018-222470

(51) Int. Cl.
| | |
|---|---|
| *H01M 8/0258* | (2016.01) |
| *H01M 8/0206* | (2016.01) |
| *H01M 8/0276* | (2016.01) |
| *H01M 8/0282* | (2016.01) |
| *H01M 8/1246* | (2016.01) |
| *H01M 8/2425* | (2016.01) |
| *H01M 8/124* | (2016.01) |

(52) U.S. Cl.
CPC ....... *H01M 8/0258* (2013.01); *H01M 8/0206* (2013.01); *H01M 8/0276* (2013.01); *H01M 8/0282* (2013.01); *H01M 8/1246* (2013.01); *H01M 8/2425* (2013.01); *H01M 2008/1293* (2013.01); *H01M 2300/0074* (2013.01)

(58) Field of Classification Search
CPC .................................................. H01M 8/0258
See application file for complete search history.

(56) References Cited

U.S. PATENT DOCUMENTS

| | | | | |
|---|---|---|---|---|
| 2006/0172141 A1* | 8/2006 | Huang | .................. | H01M 8/028 428/469 |
| 2009/0011331 A1* | 1/2009 | Stringer | .................. | C22C 29/12 429/185 |
| 2010/0331165 A1* | 12/2010 | Lee | .......................... | C03C 8/18 501/32 |

FOREIGN PATENT DOCUMENTS

| | | |
|---|---|---|
| JP | 201438758 A | 2/2014 |
| JP | WO2014122807 A1 | 1/2017 |
| WO | 2014122807 A1 | 8/2014 |

* cited by examiner

*Primary Examiner* — Brian R Ohara
(74) *Attorney, Agent, or Firm* — Law Office of Katsuhiro Arai

(57) ABSTRACT

A fuel cell includes: a solid oxide electrolyte layer that has oxygen ion conductivity; an electrode layer that is provided on the solid oxide electrolyte layer; a separator that is provided on the electrode layer and is made of a metal material; and a sealing member that is provided from a circumference region of the solid oxide electrolyte layer to a circumference region of the dense metal layer, wherein the electrode layer, the separator and the sealing member demarcate at least a part of a gas passage, wherein at least a part of the sealing member is a mixed layer of a ceramic and a metal.

13 Claims, 6 Drawing Sheets

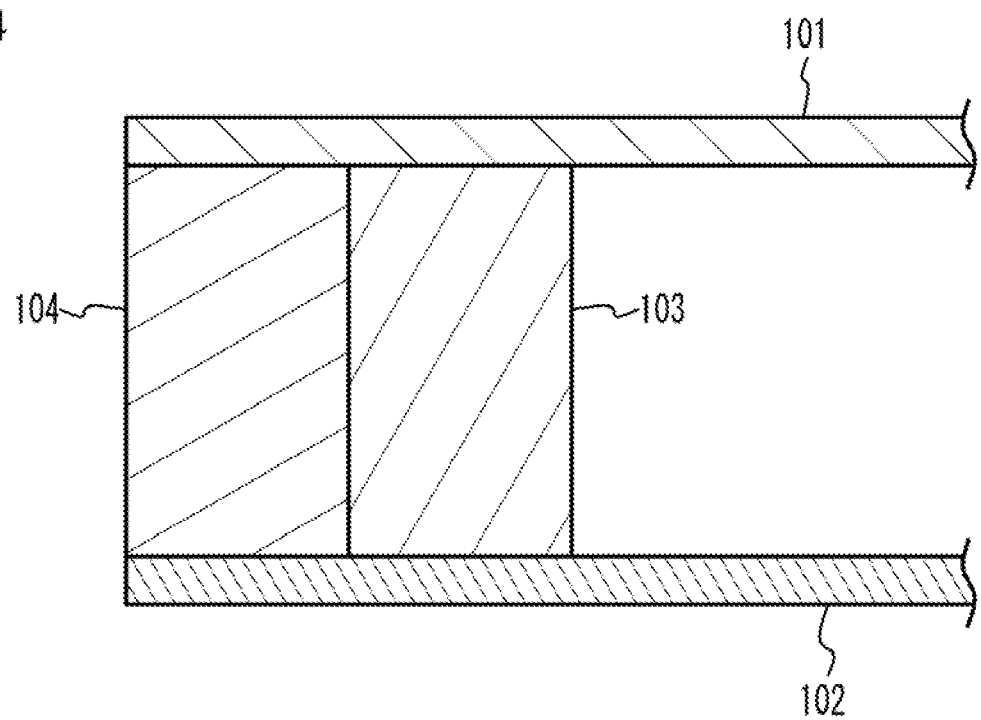

FIG. 5A
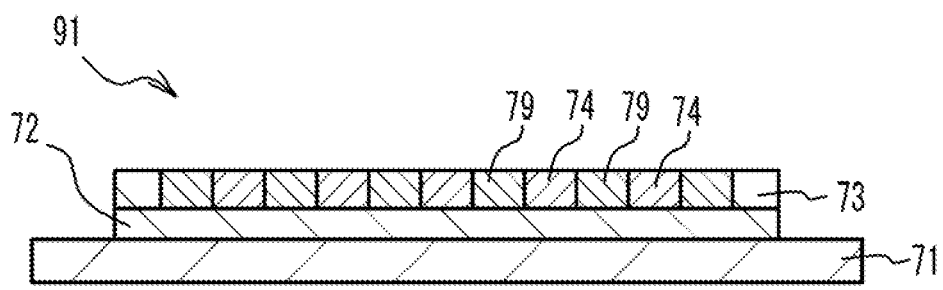
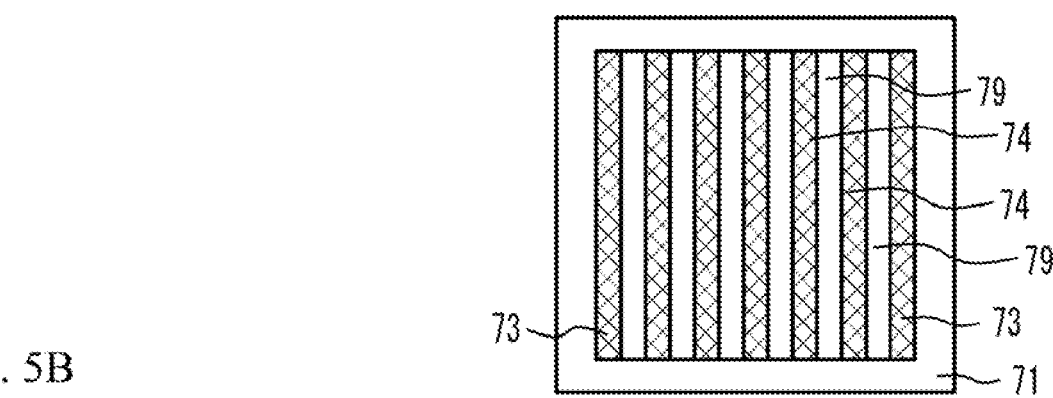
FIG. 5B
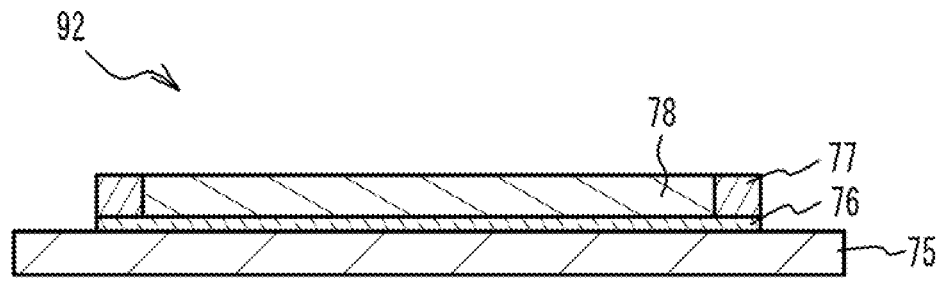
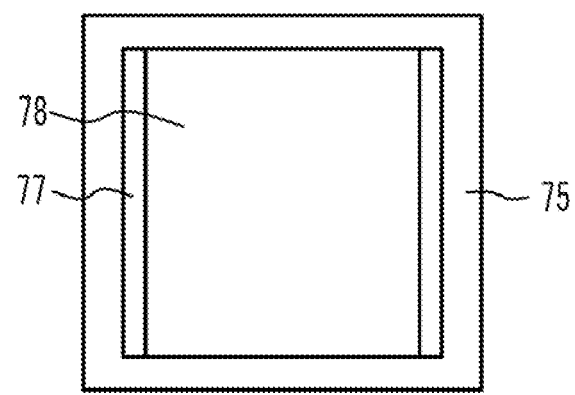

FUEL CELL AND FUEL CELL STACK

CROSS-REFERENCE TO RELATED APPLICATION

This application is based upon and claims the benefit of priority of the prior Japanese Patent Application No. 2018-222470, filed on Nov. 28, 2018, the entire contents of which are incorporated herein by reference.

FIELD

A certain aspect of the present invention relates to a fuel cell and a fuel cell stack.

BACKGROUND

There is known a solid oxide type fuel cell system in which a plurality of fuel cells are stacked (for example, see International Publication No. 2014/122807). There is a case where a metal interconnector is used for demarcating a gas passage (for example, see Japanese Patent Application Publication No. 2014-38758).

SUMMARY OF THE INVENTION

When a metal material is used as an interconnector for demarcating a gas passage and a fuel cell is manufactured by a one lot firing, favorable adhesion of a sealing member may not be necessarily achieved between a solid oxide electrolyte layer and an interconnector. Therefore, favorable gas sealing characteristic may not be necessarily achieved.

The present invention has a purpose of providing a fuel cell and a fuel cell stack that has a gas sealing member having favorable gas sealing characteristic.

According to an aspect of the present invention, there is provided a fuel cell including: a solid oxide electrolyte layer that has oxygen ion conductivity; an electrode layer that is provided on the solid oxide electrolyte layer; a separator that is provided on the electrode layer and is made of a metal material; and a sealing member that is provided from a circumference region of the solid oxide electrolyte layer to a circumference region of the dense metal layer, wherein the electrode layer, the separator and the sealing member demarcate at least a part of a gas passage, wherein at least a part of the sealing member is a mixed layer of a ceramic and a metal.

According to another aspect of the present invention, there is provided a fuel cell stack including: a plurality of unit cells that are stacked and have a structure in which electrode layers are provided on both faces of a solid oxide electrolyte layer having oxygen ion conductivity, wherein a separator made of a metal material is provided between two unit cells next to each other, wherein the separator acts as gas passages of reaction gas supplied to the electrode layers, wherein a sealing member is provided from a circumference region of the separator to a circumference region of the solid oxide electrolyte layer of a unit cell next to the separator, wherein at least a part of the sealing member is a mixed layer of ceramic and metal.

BRIEF DESCRIPTION OF THE DRAWINGS

FIG. 4 illustrates a sealing member in a case where a separator is made of a cramic;

FIG. 5A and FIG. 5B illustrate a manufacturing method of a fuel cell stack; and

DETAILED DESCRIPTION

A description will be given of an embodiment with reference to the accompanying drawings.

Figure 1:
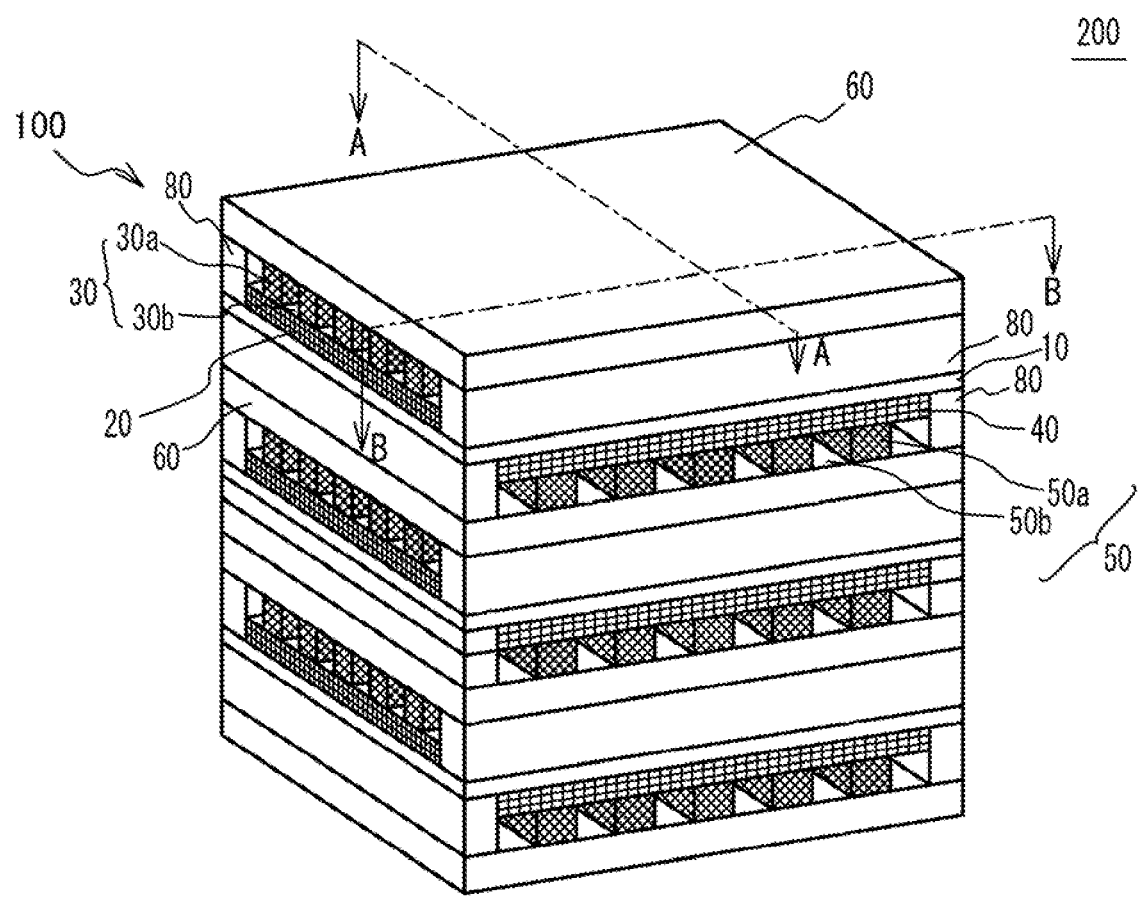
FIG. 1 illustrates an external perspective view of a fuel cell stack.
Figure 2A:
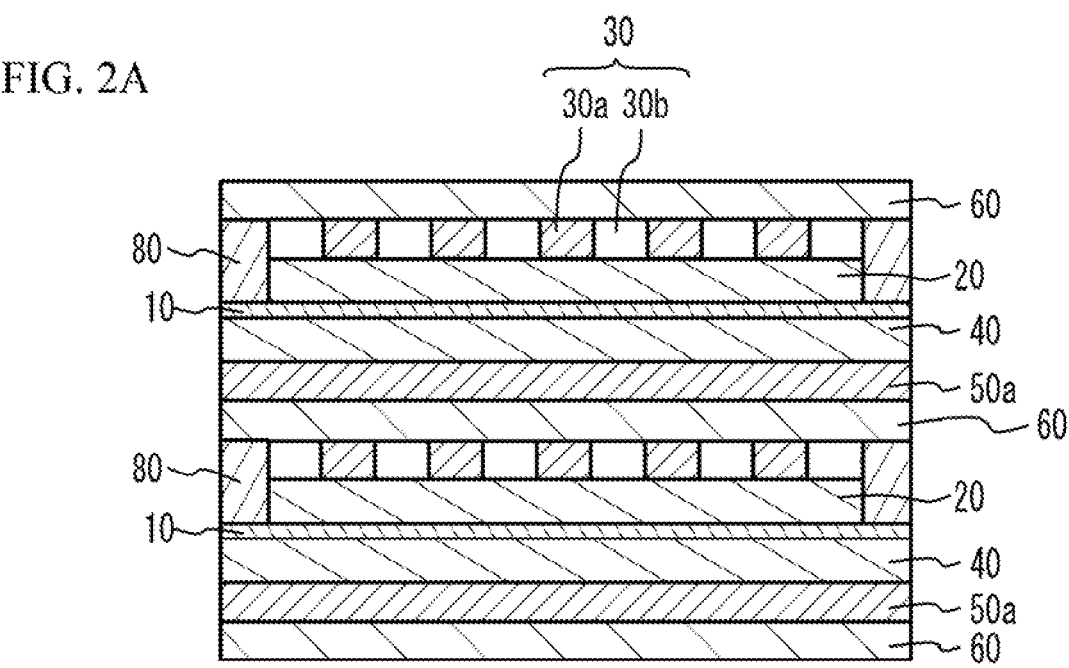
FIG. 2A illustrates a cross sectional view taken along a lune A-A of FIG. 1.
Figure 2B:
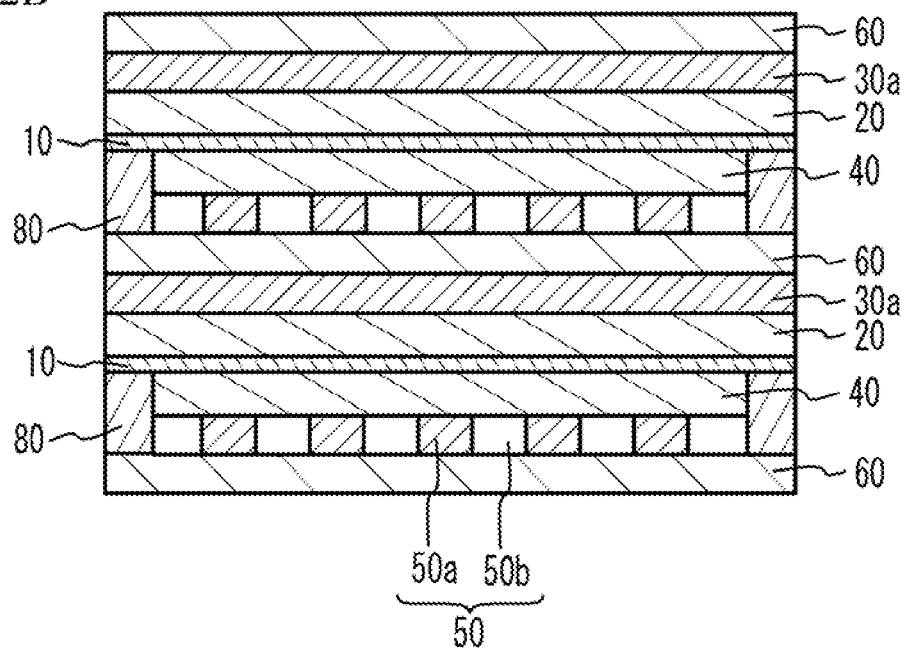
FIG. 2B illustrates a cross sectional view taken along a line B-B of FIG. 1.

FIG. 1 illustrates an external perspective view of a fuel cell stack 200. FIG. 2A illustrates a cross sectional view taken along a lune A-A of FIG. 1. FIG. 2B illustrates a cross sectional view taken along a line B-B of FIG. 1.

As illustrated in FIG. 1, the fuel cell stack 200 has a structure in which a plurality of fuel cells 100 are stacked. The fuel cell 100 has a structure in which a cathode 20 (first electrode layer), a first metal porous layer 30 and a separator 60 are stacked on an upper face (first face) of a solid oxide electrolyte layer 10 in this order, and an anode 40 (second electrode layer), a second metal porous layer 50 and another separator 60 are stacked on a lower face (second face) of the solid oxide electrolyte layer 10 in this order. The first metal porous layer 30 has a first metal porous part 30a and a gas passage 30b. The second metal porous layer 50 has a second metal porous part 50a and a gas passage 50b. The separator 60 is a member which is commonly used by two fuel cells 100 next to each other. A combination of the first metal porous layer 30, the separator 60 and the second metal porous layer 50 may be referred to as an interconnector. The interconnector is a member for electrically connecting cells in series. Each cell includes the solid oxide electrolyte layer 10, the cathode 20 and the anode 40. A combination of the solid oxide electrolyte layer 10, the cathode 20, the first metal porous layer 30, the anode 40 and the second metal porous layer 50 may be referred to as a unit SOFC.

The solid oxide electrolyte layer 10 is a dense layer of solid oxide electrolyte having oxygen ion conductivity. The cathode 20 is an electrode having electrode activity as a cathode. The cathode 20 has electron conductivity and oxygen ion conductivity. The anode 40 is an electrode having electrode activity as an anode. The anode 40 has electron conductivity and oxygen ion conductivity. The first metal porous layer 30 and the second metal porous layer 50 have gas permeability and support the solid oxide electrolyte layer 10. The separator 60 is a dense metal layer and has gas sealing characteristic. The separator 60 demarcates a part of a gas passage formed by the first metal porous layer 30 and demarcates a part of a gas passage formed by the second metal porous layer 50. The cathode 20 demarcates a part of the gas passage demarcated by the first metal porous layer 30. The anode 40 demarcates a part of the gas passage demarcated by the second metal porous layer 50.

The fuel cell 100 generates electrical power by the following operation. Oxidant gas including oxygen such as air is supplied to the first metal porous part 30a and the gas passage 30b. The oxidant gas reaches the cathode 20 via the first metal porous part 30a and the gas passage 30b. In the cathode 20, the oxygen in the cathode 20 reacts with an electron supplied from an external electrical circuit and becomes an oxygen ion. The oxygen ion conducts through the solid oxide electrolyte layer 10 and moves toward the anode 40. On the other hand, fuel gas including hydrogen such as hydrogen gas or reformed gas is supplied to the second metal porous part 50a and the gas passage 50b. The fuel gas reaches the anode 40 via the second metal porous part 50a and the gas passage 50b. The hydrogen in the anode 40 releases an electron, reacts with the oxygen ion having conducted through the solid oxide electrolyte layer 10 from the cathode 20, and becomes water ($H_2O$). A released electron is extracted outward by an external electrical circuit. The extracted electron electrically works, and then is supplied to the cathode 20. With the operation, the electrical power is generated.

The solid oxide electrolyte layer 10, the cathode 20, the first metal porous layer 30, the anode 40 and the second metal porous layer 50 have a rectangular shape having approximately the same size. Therefore, the solid oxide electrolyte layer 10, the cathode 20, the first metal porous layer 30, the anode 40 and the second metal porous layer 50 form a rectangular parallelepiped shape. In the rectangular parallelepiped shape, among four side faces other than an upper face and a lower face, a pair of two side faces facing with each other are referred to as a first side face and a second side face. The other pair of two side faces facing with each other are referred to as a third side face and a fourth side face.

As illustrated in FIG. 2A, a sealing member 80 is provided on the first side face and the second side face of the cathode 20. Therefore, a passage of oxidant gas is demarcated by the sealing member 80 and the separator 60 contacting to the first metal porous layer 30. Thus, in the first metal porous layer 30, the oxidant gas moves from one of the third side face and the fourth side face to the other.

As illustrated in FIG. 2B, another sealing member 80 is provided on the third side face and the fourth side face of the anode 40. Therefore, a passage of fuel gas is demarcated by the sealing member 80 and the separator 60 contacting to the second metal porous layer 50. Thus, in the second metal porous layer 50, the fuel gas moves from one of the first side face and the second side face to the other.

Figure 3:
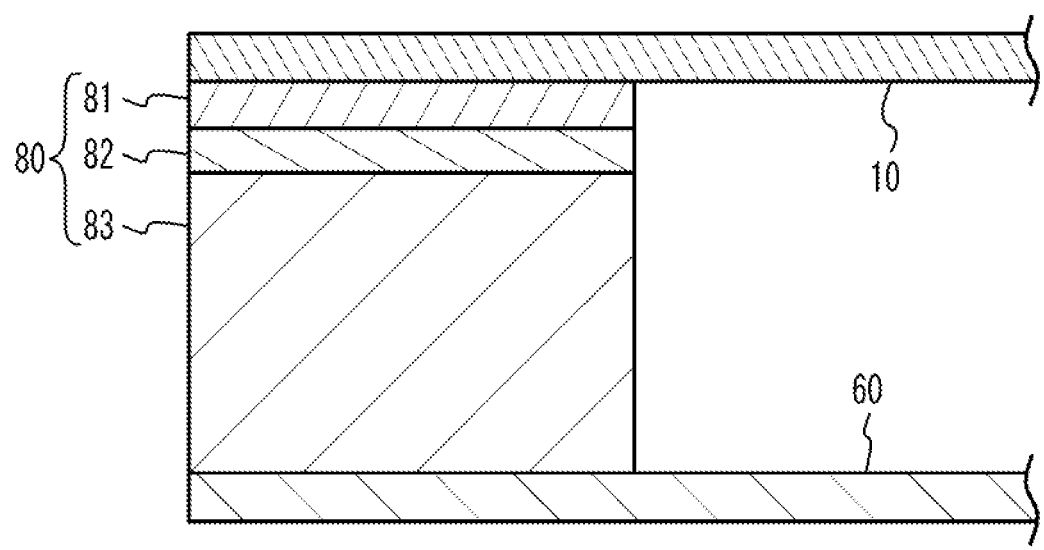
FIG. 3 illustrates details of a sealing member.

FIG. 3 illustrates details of the sealing member 80. As illustrated in FIG. 3, the sealing member 80 is provided from a circumference region of the solid oxide electrolyte layer 10 to a circumference region of the separator 60. For example, the sealing member 80 is provided from a circumference region of a lower face of the solid oxide electrolyte layer 10 to a circumference region of an upper face of the separator 60 below the solid oxide electrolyte layer 10. Another sealing member 80 is provided from a circumference region of an upper face of the solid oxide electrolyte layer 10 to a circumference region of a lower face of another separator 60 above the solid oxide electrolyte layer 10.

The sealing member 80 has a ceramic layer 81, a mixed layer 82 and a metal layer 83. In the mixed layer 82, a ceramic and a metal are mixed with each other. For example, metal grains and ceramic grains are randomly mixed. Each layer of the sealing member 80 is a dense layer. The ceramic layer 81 contacts to the solid oxide electrolyte layer 10. The metal layer 83 contacts to the separator 60. The mixed layer 82 is provided between the ceramic layer 81 and the metal layer 83 so as to contact to the ceramic layer 81 and the metal layer 83.

The metal layer 83 and the separator 60 are metal layers. Therefore, favorable adhesion is achieved between the metal layer 83 and the separator 60. Next, the ceramic layer 81 and the solid oxide electrolyte layer 10 are ceramic layers. Therefore, favorable adhesion is achieved between the ceramic layer 81 and the solid oxide electrolyte layer 10. Next, favorable adhesion is achieved between the mixed layer 82 and the metal layer 83 because the mixed layer 82 includes a metal. And, favorable adhesion is achieved between the mixed layer 82 and the ceramic layer 81, because the mixed layer 82 includes a ceramic. Accordingly, the solid oxide electrolyte layer 10, the ceramic layer 81, the mixed layer 82, the metal layer 83 and the separator 60 have favorable adhesion with each other. Therefore, favorable gas sealing characteristic is achieved.

The ceramic layer 81 may not be necessarily provided. In this case, favorable adhesion is achieved between the solid oxide electrolyte layer 10 and the mixed layer 82, because the mixed layer 82 incudes a ceramic. The metal layer 83 may not be necessarily provided. In this case, favorable adhesion is achieved between the mixed layer 82 and the separator 60, because the mixed layer 82 incudes a metal.

However, when the ceramic layer 81 is provided, a distance between the cathode 20 and the anode 40 is enlarged. Thus, short is suppressed between the cathode 20 and the anode 40, even if a sheet for forming each layer extends a little in a process of molding or cutting. It is therefore preferable that the ceramic layer 81 is provided.

When the metal layer 83 is provided, a ratio of a metal portion in the whole of the fuel cell stack 200 is enlarged. Therefore, resistance to vibration is enlarged, and resistance to thermal shock is enlarged. The fuel cell stack 200 has resistance to rapid temperature increasing and rapid temperature decreasing. It is therefore preferable that the metal layer 83 is provided.

From a viewpoint of enlarging the gas sealing characteristic of the sealing member 80, it is preferable that porosity of the sealing member 80 is small. For example, it is preferable that the porosity of the sealing member 80 is 10% or less. It is more preferable that the porosity of the sealing member 80 is 2% or less. The porosity has meaning opposite to a dense degree. It is therefore preferable that the dense degree of the sealing member 80 is 90% or more. It is more preferable that the dense degree is 98% or more. It is possible to calculate the dense degree by measuring an area of a dense portion and a total area of a void portion and the dense portion, and calculating a ratio of them (the area of the dense portion/the total area of the void portion and the dense portion), on the basis of an SEM (Scanning Electron Microscopy) image of a cross section. It is possible to calculate the porosity by calculating (the area of the void portion/the total area of the void portion and the dense portion).

It is preferable that a ceramic component and a metal component are mixed in the mixed layer 82, with a volume ratio of 3:7 to 7:3. This is because when the volume ratio of the ceramic component is 30% or less, adhesion between the mixed layer 82 and the ceramic layer 81 is small, and mixed layer 82 and the ceramic layer 81 may be peeled from each other. On the other hand, when the volume ratio of the metal component in the mixed layer 82 is 30% or less, the adhesion between the metal layer 83 and the mixed layer 82 is small and the mixed layer 82 and the metal layer 83 may be peeled from each other. It is preferable that the volume ratio between the ceramic component and the metal component in the mixed layer 82 is 4:6 to 6:4.

A thickness of the sealing member 80 is a total of a thickness of the gas passage 30b through which the gas flows and a thickness of the cathode 20. The thickness is a total of a thickness of the gas passage 50b and a thickness of the anode 40. From a viewpoint of securing a necessary gas flow amount, it is preferable that the thickness of the sealing member 80 is 90 μm or more. When the sealing member 80 is excessively thick, the whole volume is large and downsizing of the fuel cell stack 200 may be difficult. It is therefore preferable that the thickness of the sealing member 80 is 90μ to 300 μm.

From a viewpoint of enlarging a ratio of a metal in the whole of the fuel cell stack 200, it is preferable that the metal layer 83 is thick. For example, it is preferable that the thickness of the metal layer 83 is 70% or more in the sealing member 80. It is more preferable that the thickness is 80% or more. On the other hand, when the ratio of the metal layer 83 is excessively large, the ratio of the ceramic layer 81 and the mixed layer 82 is small and desirable adhesion may not be necessarily achieved. And so, it is preferable that the thickness of the metal layer 83 has an upper limit. In concrete, it is preferable that the thickness of the metal layer 83 is 95% or less in the sealing member 80. It is more preferable that the thickness is 90% or less. It is preferable that the thickness of the metal layer 83 is 70 μm or more and 210 μm or less.

The material of the metal layer 83 is not limited. It is preferable that the metal layer 83 has resistance to heat. And so, it is preferable that the material of the metal layer 83 is an alloy including at least one of C, Si, Al, Nb, Mo, Y, Ce, Cr, Fe, Ti, Cu, Mn, La, W, Ni and Zr and including 10 wt % to 95 wt % of Cr and including 10 wt % or less of additive other than Fe and Cr, and the rest of the metal layer 83 is Fe component. It is preferable that the metal layer 83 has a thermal expansion coefficient which is close to that of the solid oxide electrolyte layer 10 ($10.3 \times 10^{-6}$/° C.). A preferable thermal expansion coefficient of the metal layer 83 is $10 \times 10^{-6}$/° C. to $13 \times 10^{-6}$/° C. An alloy composition of the metal layer 83 may be controlled in order to achieve the thermal expansion coefficient. For example, the thermal expansion coefficient of 18Cr-3Al-1Ti-78Fe ferrite-based stainless alloy powder is $10 \times 10^{-6}$/° C. which is approximately the same as that of the solid oxide electrolyte layer 10.

It is preferable that a material having high insulating performance is used as the ceramic layer 81. For example, the material is such as YSZ (yttria stabilized zirconia), ScYSZ (scandia yttria stabilized zirconia), $Al_2O_3$, $SiO_2$ or the like. This is because the material suppresses short between the anode and the cathode during cutting a multi-layer structure.

From a viewpoint of enlargement of the thickness of the metal layer 83, it is preferable that the thickness of the ceramic layer 81 has an upper limit. For example, in the sealing member 80, it is preferable that the thickness of the ceramic layer 81 is 15% or less. It is more preferable that the thickness of the ceramic layer 81 is 10% or less. On the other hand, when the ceramic layer 81 is excessively thin, sufficient adhesion may not be necessarily achieved between the solid oxide electrolyte layer 10 and the sealing member 80. And so, it is preferable that the thickness of the ceramic layer 81 has a lower limit. For example, in the sealing member 80, it is preferable that the thickness of the ceramic layer 81 is 3% or more. It is more preferable that the thickness of the ceramic layer 81 is 5% or more. It is preferable that the thickness of the ceramic layer 81 is, for example, 5 μm to 20 μm.

From a viewpoint of enlargement of the thickness of the metal layer 83, it is preferable that the thickness of the mixed layer 82 has an upper limit. For example, in the sealing member 80, it is preferable that the thickness of the mixed layer 82 is 30% or less. It is more preferable that the thickness of the mixed layer 82 is 10% or less. On the other hand, when the mixed layer 82 is excessively thin, sufficient adhesion may not be necessarily achieved between the solid oxide electrolyte layer 10 and the sealing member 80 and between the separator 60 and the sealing member 80. And so, it is preferable that the thickness of the mixed layer 82 has a lower limit. For example, in the sealing member 80, it is preferable that the thickness of the mixed layer 82 is 5% or more with respect to the sealing member 80. It is more preferable that the thickness of the mixed layer 82 is 10% or more. It is preferable that the thickness of the mixed layer 82 is, for example, 10 μm to 30 μm.

A description will be given of a solid oxide fuel cell in which almost all of elements are made of ceramic. For example, a separator is made of a ceramic. In this case, a sealing member is made in accordance with characteristic of a ceramics material. For example, it is thought that a sealing member illustrated in FIG. 4 is provided. For example, the sealing member has a dense part 103 made of a ceramic inside between a solid electrolyte layer 101 and a separator 102 and a thermal expansion adjuster 104 outside between the solid electrolyte layer 101 and the separator 102. The sealing member has gas sealing characteristic because the sealing member has the dense part 103. However, toughness of the ceramic material is low. When the ceramic material is fired and is thereby dense, a mismatch of a thermal expansion coefficient between the ceramic material and other materials occurs. Therefore, the ceramic material is easily broken. In order to suppress the mismatch of the thermal expansion coefficient, the thermal expansion adjuster 104 is provided. That is, the thermal expansion adjuster is necessary in addition to the dense part.

However, the first metal porous layer 30, the second metal porous layer 50 and the separator 60 are made of a metal material, in the fuel cell stack 200 of the embodiment. When each member is formed by a printing technology and a one lot firing technology, a ratio of metal components is large in the fuel cell stack 200. For example, a ratio of the metal components is 70 vol % or more in the fuel cell stack 200 which has a structure in which a plurality of fuel cells 100 are stacked through an interconnector (the first metal porous part 30*a*, the gas passage 30*b*, the second metal porous part 50*a*, the gas passage 50*b* and the separator 60). The structure is hardly broken, because Young's modulus of the metal material is high. Therefore, even if a gas sealing member is structured with only dense members, the gas sealing member is hardly broken. When the composition of the metal material is adjusted, the thermal expansion coefficient of the metal material can be close to the thermal expansion coefficient of the ceramic part. It is therefore important to achieve adhesion between the ceramic and the metal by adjusting the thermal expansion coefficient of the sealing member, in the fuel cell stack 200 of the embodiment.

The fuel cell 100 has a structure for suppressing crack during the firing process. In concrete, a main component of a material having electron conductivity of the cathode 20 is common with a main component of a material having electron conductivity of the anode 40. Moreover, a main component of a material having oxygen ion conductivity of the cathode 20 is common with a main component of a material having oxygen ion conductivity of the anode 40. With the structure, materials of the cathode 20 are similar to materials of the anode 40. Therefore, during removing a binder in the firing process of the cathode 20 and the anode 40, bias of the contraction stress of the cathode 20 and the anode 40 is suppressed and the crack is suppressed. It is therefore possible to form a cell part including the solid oxide electrolyte layer 10, the cathode 20 and the anode 40, by a printing technology and a one lot firing technology. Therefore, the fuel cell 100 can be downsized. When the fuel cell 100 is downsized, it is possible to increase the number of stacks. Thereby, desirable amount of electrical power can be achieved.

For example, the main component of the electron and oxygen ion conductive material used for the cathode 20 and the anode 40 is not limited. For example, it is thought that a material having both of the electron conductivity and the oxygen ion conductivity (an electron and oxygen ion conductive material) is used as the cathode 20 and the anode 40. For example, the electron and oxygen ion conductive material is such as a $LaMnO_3$-based material, a $LaCoO_3$-based material or the like. However, in the one lot firing process, metal powder of the first metal porous layer 30 and the second metal porous layer 50 are fired together with the cathode 20 and the anode 40. Therefore, it is preferable that firing atmosphere is reductive atmosphere. When the $LaMnO_3$-based material or the $LaCoO_3$-based material is used as a main component of the electron and oxygen ion conductive material, it is difficult to fire the electron and oxygen ion conductive material in a reductive atmosphere although favorable performance of generating electrical power is achieved. And so, it is preferable that the main component of the electron and oxygen ion conductive material has resistance against reduction. For example, a $CeO_2$-based material in which Gd is doped, or the like may be used as the main component of the electron and oxygen ion conductive material.

The electron and oxygen ion conductivity may be totally achieved, by using a material having electron conductivity and another material having oxygen ion conductivity, as another method. The material having the oxygen ion conductivity is not limited. For example, it is preferable that scandia yttria stabilized zirconia (ScYSZ) is used as the main component of the material having the oxygen ion conductivity. For example, it is preferable that ScYSZ having a composition range including 5 mol % to 16 mol % of scandia ($Sc_2O_3$) and 1 mol % to 3 mol % of yttria ($Y_2O_3$) is used. It is more preferable that ScYSZ of which a total amount of the scandia and the yttria is 6 mol % to 15 mol % is used. This is because the highest conductivity of oxygen ion is achieved in the range. The material having the oxygen ion conductivity is a material of which a transport number of oxygen ion is 99% or more.

Next, the material having the electron conductivity is not limited. A metal such as Ni may be used as the material having the electron conductivity. It is preferable that the material having the electron conductivity may be an alloy including one or more of C, Si, Y, Ce, Cr, Fe, Ti, Cu, Mn, La, W, Ni or Zr, and 10 wt % to 95 wt % of Cr, and 30 wt % or less of another element. In concrete, it is preferable that Fe-18 to 22 Cr alloy is used. When the metal and the material of the alloy are used, an SOFC system has large mechanical strength and has resistance against rapid temperature changing. With the characteristic, it is possible to mount the fuel system in a vehicle. When an amount of Cr is increased in the alloy, a thermal expansion coefficient of the cathode 20 and the anode 40 gets closer to a thermal expansion coefficient of the solid oxide electrolyte layer 10. Therefore, the cell has resistance against crack. Moreover, when the amount of Cr of the alloy is large, the alloy has resistance against heat. Therefore, degradation of the cell during generating electrical power is suppressed. However, for the purpose of suppressing cost and Cr poisoning in the cathode 20, it is preferable that the amount of Cr is small. Therefore, the composition of Fe-18 to 22 Cr is preferable because a balance is adequate.

A ceramic material may be used as the main component of the material having the electron conductivity used in the cathode 20 and the anode 40. For example, it is possible to use $LaCrO_3$ in which Sr is doped, or $SrTiO_3$ in which La is doped. These materials are stable in reductive atmosphere and oxidizing atmosphere. That is, these materials are stable in a large range of oxygen partial pressure. These materials hardly react with other materials (for example, electrolyte). Therefore, these materials are suitable for a manufacturing process. Stability at a high temperature of the ceramic material is superior to those of the metal and the alloy. The ceramic material is preferable in an SOFC system having high endurance. For example, the material having the electron conductivity has conductivity of 10 $S\cdot cm^{-1}$ or more at a temperature of 400 degrees C. or more which is approximately equal to that of a metal.

The main component of the material having the oxygen ion conductivity of the cathode 20 is common with the main component of the material having the oxygen ion conductivity of the anode 40, when the material having the oxygen ion conductivity is different from the material having the electron conductivity and a plurality of materials having the oxygen ion conductivity are mixed and are used. In this case, it is preferable that the plurality of the materials having the oxygen ion conductivity of the cathode 20 are common with the plurality of the materials having the oxygen ion conductivity of the anode 40. The main component of the material having the electron conductivity of the cathode 20 is common with the main component of the material having the electron conductivity of the anode 40, when the material having the oxygen ion conductivity is different from the material having the electron conductivity and a plurality of materials having the electron conductivity are mixed and are used. In this case, it is preferable that the plurality of the materials having the electron conductivity of the cathode 20 are common with the plurality of the materials having the electron conductivity of the anode 40.

It is preferable that thicknesses of the cathode 20 and the anode 40 are 50 μm or less. It is more preferable that the thicknesses of the cathode 20 and the anode 40 are 30 μm or less. This is because a thickness of an electrode effectively contributing to electrochemical reaction when using reformed gas as fuel is approximately 30 μm, and an effective thickness of an electrode when using hydrocarbon fuel is approximately 50 μm.

The cathode 20 and the anode 40 may include catalyst. For example, Ni compound such as $Ni(NO_3)_3$ or $NiCl_3$ can be used as the catalyst of the cathode 20 and the anode 40. As a doping method of Ni, a method of impregnating solution such as $Ni(NO_3)_3$ or $NiCl_3$ after firing may be used.

It is preferable that a main component of the solid oxide electrolyte layer 10 is such as $ZrO_2$ in which 6 mol % to 15 mol % of $Sc_2O_3$ (scandia) and $Y_2O_3$ (yttria) are doped. When a total concentration of $Y_2O_3$ and $Sc_2O_3$ is 6 mol % to 15 mol %, the oxygen ion conductivity is the highest. It is therefore preferable that the a material having the total concentration is used as the main component of the solid oxide electrolyte layer 10. It is preferable that the thickness of the solid oxide electrolyte layer 10 is 20 μm or less. It is more preferable that the thickness is 10 μm or less. The electrolyte layer has favorable performance when the electrolyte layer is thin. However, it is preferable that the thickness is 1 μm or more, from a viewpoint of suppressing gas leak of both sides of the electrolyte layer.

The first metal porous layer 30 and the second metal porous layer 50 are not limited. For example, a metal such as Ni may be used for the first metal porous layer 30 and the second metal porous layer 50. It is preferable that an alloy including one or more elements such as C, Si, Y, Al, Nb, Mo, Ce, Cr, Fe, Ti, Cu, Mn, La, W, Ni, Zr or the like and including 10 wt % to 95 wt % of Cr and including 10 wt % or less of additive other than Fe and Cr, in which the rest is an Fe component, is used. In concrete, Fe-18 to 22 Cr alloy may be used.

It is preferable that porosity of the first metal porous part 30a and porosity of the second metal porous part 50a are 30% or more and 70% or less. It is more preferable that the porosities are 40% or more and 60% or less. This is because gas diffusion is suppressed and generating of electrical power is suppressed, when the porosity is less than 30%. On the other hand, mechanical strength of the metal porous part is not sufficient and the metal porous part may not necessarily act as a support member of the gas passage, when the porosity is more than 70%. It is preferable that the thicknesses of the first metal porous part 30a and the second metal porous part 50a are 150 μm or less and 50 μm or more. It is more preferable that the thicknesses are 100 μm or less. When the thicknesses are small, a whole volume of the SOFC system is small and the SOFC system has advantage in downsizing. However, it is preferable that the thicknesses are 50 μm or more, from a viewpoint of securing of necessary amount of gas flow. The first metal porous layer 30 and the second metal porous layer 50 are support members for forming the gas passage. The thickness of the gas passage is approximately the same as the thicknesses of the first metal porous layer 30 and the second metal porous layer 50. An extinction material which disappears within a temperature range of 200 degrees C. to 600 degrees C. is used for the gas passage 30b and the gas passage 50b. Slurry including the extinction material is made and is printed by a line-and-space method. The extinction material is not limited. For example, an organic material such as acrylic resin may be used as the extinction material.

In the fuel cell stack 200, the dense sealing member 80 is provided from the circumference region of the solid oxide electrolyte layer 10 to the circumference region of the separator 60 (dense metal layer). And, the sealing member 80 has the mixed layer 82 of the ceramic and the metal. Therefore, high adhesion is achieved between the solid oxide electrolyte layer 10 and the sealing member 80 and between the separator 60 and the sealing member 80.

A description will be given of a manufacturing method of the fuel cell stack 200.

(Making process of a material for porous metal) Metal powder (for example, 10 μm to 100 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), an extinction material (organic material), a binder (PVB, acrylic resin, ethyl cellulose or the like) are mixed. Thus, slurry is made. The material for porous metal is used as the first metal porous layer 30 and the second metal porous layer 50. A volume ratio of organic component (the extinction material, solid material of the binder and the plasticizer) and the metal powder is, for example, 1:1 to 20:1. The amount of the organic components is adjusted in accordance with the porosity.

(Making process of a material for electrode layer) Powder of a material having electron conductivity (for example, 100 nm to 10 μm of grain diameter), powder of a material having oxygen ion conductivity (for example, 100 nm to 10 μm of grain diameter), catalyst (for example, Ni compound having a grain diameter of 10 nm to 1 or the like), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), an extinction material (organic material), and a binder (PVB, acrylic resin, ethyl cellulose or the like) are mixed. Thus, slurry is made. A solvent such as $Ni(NO_3)_3$ or $NiCl_3$ may be impregnated after firing, as a doping method of Ni. A volume ratio of organic component (the extinction material, solid material of the binder and the plasticizer) and the powder of the material having electron conductivity is, for example, 1:1 to 5:1. The amount of the organic components is adjusted in accordance with the porosity. A volume ratio of the powder of the material having electron conductivity and the powder of the material having oxygen ion conductivity is, for example, 3:7 to 7:3.

(Making process of a material for dense mixed layer) Powder of a material having electron conductivity (for example, 1 μm to 10 μm of grain diameter), powder of a material having oxygen ion conductivity (for example, 10 nm to 10 μm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. Neither catalyst nor an extinction material are mixed with the slurry, because the mixed layer has a purpose of sealing gas.

(Making process of a material for electrolyte layer) Powder of a material having oxygen ion conductivity (for example, ScYSZ, YSZ or the like, and 10 nm to 1000 nm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. A volume ratio of organic component (solid material of the binder and the plasticizer) and the powder of the material having oxygen ion conductivity is, for example, 6:4 to 3:4.

(Making process of a material for gas passage) An extinction material (organic material such as acrylic resin or polyimide resin), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), a binder (PVB, acrylic resin, ethyl cellulose or the like) are mixed. Thus, slurry is made.

(Making process of a material for dense metal) Metal powder (for example, 1 μm to 10 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), a binder (PVB (polyvinylbutyral), acrylic resin, ethyl cellulose and so on) are mixed. Thus, slurry is made. An extinction material is not mixed, for the purpose of making a dense layer by sintering. The material for dense metal is used as the separator 60, the metal layer 83. A volume ratio of organic component (solid material of the binder and the plasticizer) and the metal powder is, for example, 1:4 to 1:1.

As illustrated in an upper figure of FIG. 5A, the material for dense metal is coated on a PET (polyethylene terephthalate) film 71. And a metal powder layer 72 is formed. The metal powder layer 72 has a rectangular shape and has a thickness of 20 μm to 35 μm. For example, the metal powder layer 72 has a rectangular shape. For example, the metal powder layer 72 has a square shape of which a side has a length of 60 mm to 70 mm. Next, the material for dense metal is printed on two end portions of the metal powder layer 72 on the two side faces of the metal powder layer 72 facing with each other. Thus, two frames 73 are formed. Each of the frames 73 has a width of 1 mm to 10 mm and has a length of 60 mm to 70 mm, in accordance with accuracy of stacking and cutting. Next, the material for porous metal is printed between the two frames 73 on the metal powder layer 72, into a line-and-space shape (a reverse pattern layer with respect to the frame 73). Thus, a first multilayer structure 91 is formed. A thickness of the frame 73 is, for example, 100 µm to 200 µm. A thickness of the metal powder layer 74 is ±10 µm with respect to the thickness of the frame 73. A right lower figure of FIG. 5A is a top view.

As illustrated in an upper figure of FIG. 5B, the material for electrolyte layer is coated on a PET film 75. Thus, an electrolyte layer 76 is formed. The electrolyte layer 76 has a rectangular shape which is approximately the same as the metal powder layer 72 and has a thickness of 5 µm to 15 µm. Next, the material for electrolyte layer and the material for dense mixed layer are printed in this order on end portions of the electrolyte layer 76 on the two side faces side of the electrolyte layer 76 facing with each other. Thus, two frames 77 are formed. The frames 77 have a width of 1 mm to 10 mm and have a length of 60 mm to 70 mm, in accordance with accuracy of stacking and cutting. Next, the material for electrode layer is printed between the two frames 77 on the electrolyte layer 76. Thus, an electrode layer 78 (a reverse pattern layer with respect to the frame 77) is formed. Thus, a second multilayer structure 92 is formed. A thickness of the frame 77 is, for example, 15 µm to 40 µm. A thickness of the electrode layer 78 is, for example, ±3 µm with respect to the thickness of the frame 77. A right lower figure of FIG. 5B is a top view.

Figure 6A:
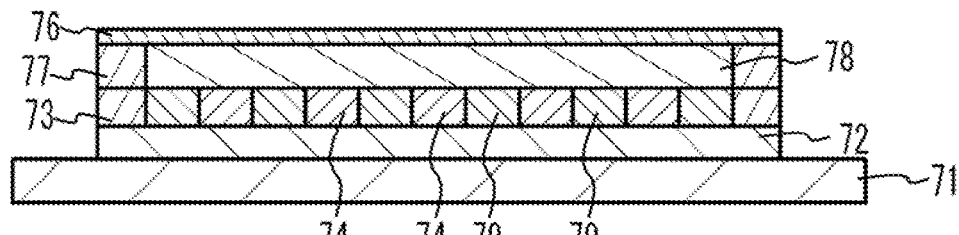
FIG. 6A to FIG. 6C illustrate a manufacturing method of a fuel cell stack.

Next, as illustrated in FIG. 6A, the first multilayer structure 91 is stacked on the second multilayer structure 92. In this case, the second multilayer structure 92 is reversed so that the electrode layer 78 is stacked on the metal powder layer 74. And, the frame 77 is stacked on the frame 73. Thus, a third multilayer structure 93 is formed. The PET 75 is peeled.

Figure 6B:
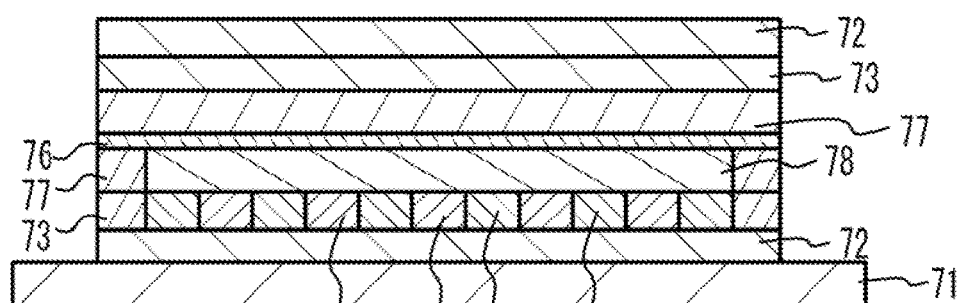

Next, as illustrated in FIG. 6B, another third multilayer structure 93 is stacked on the third multilayer structure 93 so that another electrolyte layer 76 is stacked on the electrolyte layer 76. Another third multilayer structure 93 is rotated by 90 degrees, with the two electrolyte layers 76 facing with each other. That is, side faces of the third multilayer structure 93 on which the frames 73 and the frames 77 are provided are different from side faces of another third multilayer structure 93 on which the frames 73 and the frames 77 are provided. Thus, a fourth multilayer structure 94 is formed.

Figure 6C:
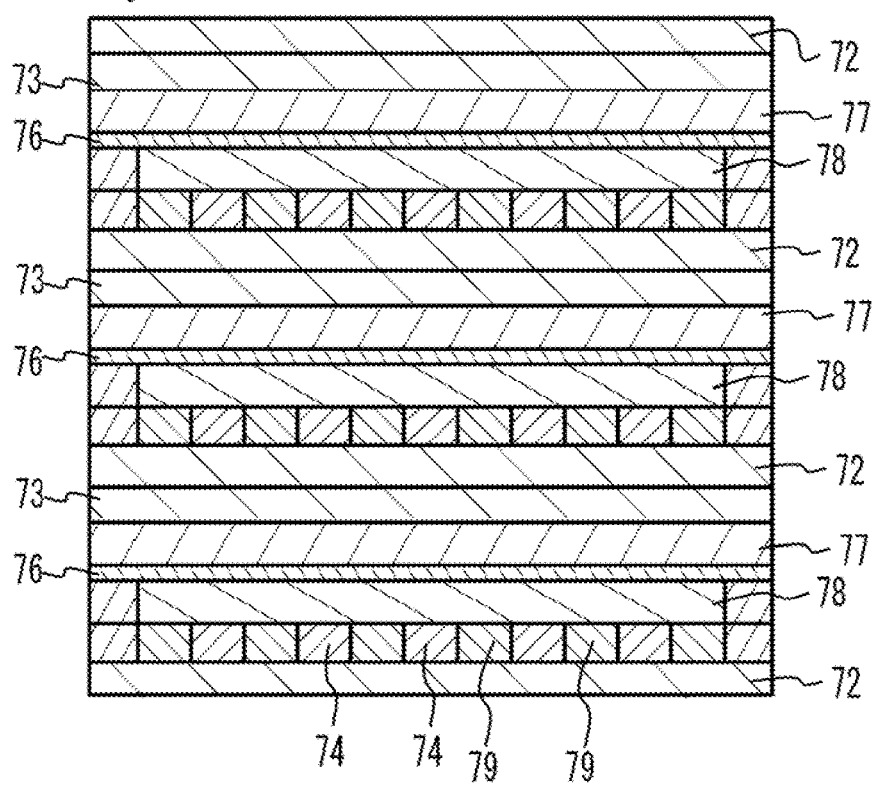

Next, the PET film 71 is peeled. And, as illustrated in FIG. 6C, a plurality of the fourth multilayer structures 94 (for example, 200) are stacked. Thus, a compact 95 is formed. In the compact 95, the electrolyte layer 76 corresponds to the solid oxide electrolyte layer 10 after firing. The electrode layer 78 on the upper face (first face) of the electrolyte layer 76 corresponds to the cathode 20 after firing. The metal powder layer 74 on the electrode layer 78 corresponds to the first metal porous part 30a after firing. The electrode layer 78 on the lower face (second face) of the electrolyte layer 76 corresponds to the anode 40 after firing. The metal powder layer 74 under the electrode layer 78 corresponds to the second metal porous part 50a after firing. The metal powder layer 72 corresponds to the separator 60 after firing. The frame 73 and the frame 77 correspond to the sealing member 80. The material for electrolyte layer of the frame 77 corresponds to the ceramic layer 81. The material for dense mixed layer of the frame 77 corresponds to the mixed layer 82. The frame 73 corresponds to the metal layer 83.

The compact 95 is subjected to isostatic pressing at a pressure of 100 MPa or the like. Thereby, each layer adheres to each other. The compact 95 is cut into a square of which a side has a length of 60 mm to 65 mm. After that, the binder is removed in normal atmosphere. The organic components are slowly decomposed in a temperature range of 200 degrees C. to 700 degrees C. Therefore, the temperature is slowly increased to the temperature range of 200 degrees C. to 700 degrees C. in a week or so, in order to suppress defect of the removing of the binder. After that, the temperature is kept at 700 degrees C. for one hour or the like.

The compact 95 of which the binder is removed is supplied in a reduction firing furnace and is fired in a reductive atmosphere of 100% $H_2$, or a reductive atmosphere of 0.1% to 4% $H_2$ and Ar. A known manufacturing method of an SOFC stack by a one lot firing may be applied. That is, the firing is performed so that at least one of the metal and the ceramic material is sintered, and a desirable sintered dense structure or a sintered porous structure is formed. It is preferable that all elements are fired together with each other. For example, a heating process in a temperature range of 1200 degrees C. to 1550 degrees C. may be used. It is preferable that the temperature range is 1250 degrees C. to 1400 degrees C. A firing time within the temperature range is not limited. When the elements are slowly fired, a difference of contraction of the layers is suppressed. For example, the firing time may be a few hours to a few tens of hours. A material 79 for gas passage disappears in one of heating processes.

After that, the catalyst is impregnated into the cathode 20 and the anode 40, if necessary. Thus, the fuel cell stack 200 is manufactured. For example, when the catalyst is impregnated into the anode 40, the cathode 20 is covered with a masking tape. A solvent of nickel nitrate or nickel chloride is impregnated into the anode 40. And the anode 40 is dried. On the other hand, a solvent of precursor of nitrate to be Ag nitrate, Pr nitrate, LSM, LSC or LSCF is impregnated into the cathode 20 and is dried. After that, the fuel cell stack 200 is subjected to a heating process of 300 degrees C. to 850 degrees C. in normal atmosphere. The impregnated solvent is decomposed and is reacted with each other. Thus, a desirable catalyst is obtained.

In the manufacturing method of the embodiment, the dense sealing member 80 is formed from the circumference region of the solid oxide electrolyte layer 10 to the circumference region of the separator 60 (dense metal layer). The sealing member 80 has the mixed layer 82 of the ceramic and metal. Therefore, high adhesion of the sealing member 80 is achieved between the solid oxide electrolyte layer 10 and the separator 60. A whole of the frame 73 and the frame 77 may be the material for a dense mixed layer.

EXAMPLE

The fuel cell stack 200 was manufactured in accordance with the above-mentioned embodiment. Fe—Cr alloy powder having a diameter of 20 µm was used as the material for porous metal. Fe—Cr alloy powder having a diameter of 5 µm and 10Sc1YSZ powder having a diameter of 100 nm were used as the material for electrode layer. Fe—Cr alloy powder having a diameter of 5 µm and 10Sc1YSZ powder having a diameter of 100 nm were used as the material for dense mixed layer. 10Sc1YSZ powder having a diameter of 100 nm was used as the material for electrolyte layer. Acrylic resin was used as the material for gas passage. Fe—Cr alloy powder having a diameter of 20 µm was used as the material for dense metal. After firing, the width of the sealing member 80 was 3 mm. The first metal porous part 30*a* and the gas passage 30*b* were designed to have a large thickness in order to allow air flow in the first metal porous part 30*a* and the gas passage 30*b*. The thickness of the metal layer 83 was 95 µm. The thickness of the mixed layer 82 on the metal layer 83 was 10 µm. The thickness of the ceramic layer 81 on the mixed layer 82 was 10 µm. The total thickness of the sealing member 80 was 115 µm. On the other hand, the second metal porous part 50*a* and the gas passage 50*b* were designed to have a small thickness in order to allow fuel gas flow in the second metal porous part 50*a* and the gas passage 50*b*. The thickness of the sealing member 80 after firing was 70 µm. The total thickness of the metal layer 83 was 90 µm. The thickness of the mixed layer 82 on the metal layer 83 was 10 µm. The thickness of the ceramic layer 81 on the mixed layer 82 was 10 µm. The dense degree of the whole of the sealing member 80 was 98% so that oxygen and fuel cell (hydrogen or the like) were not mixed.

Although the embodiments of the present invention have been described in detail, it is to be understood that the various change, substitutions, and alterations could be made hereto without departing from the spirit and scope of the invention.

What is claimed is:

1. A fuel cell comprising:
   a solid oxide electrolyte layer that has oxygen ion conductivity;
   an electrode layer that is provided on the solid oxide electrolyte layer;
   a separator that is provided on the electrode layer and is made of a metal material; and
   a sealing member that is provided from a circumference region of the solid oxide electrolyte layer to a circumference region of the separator,
   wherein the electrode layer, the separator and the sealing member demarcate at least a part of a gas passage,
   wherein at least a part of the sealing member is a mixed layer of a ceramic and a metal in which metal grains and ceramic grains are randomly which metal grains and ceramic grains are randomly mixed,
   wherein a thickness of the mixed layer in the sealing member is 30% or less with respect to a thickness of the sealing member.

2. The fuel cell as claimed in claim 1, wherein porosity of the sealing member is 10% or less.

3. The fuel cell as claimed in claim 1, wherein a volume ratio of the ceramic and the metal in the mixed layer is 3:7 to 7:3.

4. The fuel cell as claimed in claim 1, wherein a thickness of the sealing member is 90 µm to 300 µm.

5. The fuel cell as claimed in claim 1, wherein the sealing member has a ceramic layer between the mixed layer and the solid oxide electrolyte layer.

6. The fuel cell as claimed in claim 5, wherein a thickness of the ceramic layer in the sealing member is 15% or less with respect to a thickness of the sealing member.

7. The fuel cell as claimed in claim 1, wherein the sealing member has a metal layer between the mixed layer and the separator.

8. The fuel cell as claimed in claim 7, wherein a thickness of the metal layer in the sealing member is 70% or more with respect to a thickness of the sealing member.

9. The fuel cell as claimed in claim 7, wherein a thermal expansion coefficient of the metal layer is $10 \times 10^{-6}/°$ C. to $13 \times 10^{-6}/°$ C.,
   wherein the metal layer is an alloy including at least one of C, Si, Al, Nb, Mo, Y, Ce, Cr, Fe, Ti, Cu, Mn, La, W, Ni and Zr and including 10 wt % to 95 wt % of Cr and including 10 wt % or less of additive other than Fe and Cr,
   wherein a rest of the metal layer is an Fe component.

10. The fuel cell as claimed in claim 1, further comprising:
    a metal porous layer between the separator and the electrode layer.

11. A fuel cell stack comprising:
    a plurality of unit cells that are stacked and have a structure in which electrode layers are provided on both faces of a solid oxide electrolyte layer having oxygen ion conductivity,
    wherein a separator made of a metal material is provided between two unit cells next to each other,
    wherein the separator acts as gas passages of reaction gas supplied to the electrode layers,
    wherein a sealing member is provided from a circumference region of the separator to a circumference region of the solid oxide electrolyte layer of a unit cell next to the separator,
    wherein at least a part of the sealing member is a mixed layer of ceramic and wherein at least a part of the sealing member is a mixed layer of ceramic and metal,
    wherein a thickness of the mixed layer in the sealing member is 30% or less with respect to a thickness of the sealing member.

12. The fuel cell stack as claimed in claim 11, wherein a volume ratio of a metal component is 70 vol % or more.

13. The fuel cell as claimed in claim 1,
    wherein the sealing member has a ceramic layer between the mixed layer and the solid oxide electrolyte layer,
    wherein the ceramic layer is a dense layer.

* * * * *

UNITED STATES PATENT AND TRADEMARK OFFICE
CERTIFICATE OF CORRECTION

| | |
|---|---|
| PATENT NO. | : 11,251,439 B2 |
| APPLICATION NO. | : 16/684394 |
| DATED | : February 15, 2022 |
| INVENTOR(S) | : Li et al. |

It is certified that error appears in the above-identified patent and that said Letters Patent is hereby corrected as shown below:

In the Claims

At Column 13, Lines 47-48, in Claim 1, the phrase "are randomly which metal grains and ceramic grains" should be deleted.

At Column 14, Lines 43-44, in Claim 11, the phrase "wherein at least a part of the sealing member is a mixed layer of ceramic" should be deleted.

Signed and Sealed this
Seventh Day of June, 2022

Katherine Kelly Vidal
*Director of the United States Patent and Trademark Office*